United States Patent [19]

Kume

[11] 4,056,643
[45] Nov. 1, 1977

[54] METHOD FOR DECORATIVE COLORING OF GLASS

[75] Inventor: Makoto Kume, Ashiya, Japan

[73] Assignee: Nippon Sheet Glass Co., Ltd., Japan

[21] Appl. No.: 687,375

[22] Filed: May 17, 1976

[30] Foreign Application Priority Data

Dec. 8, 1973 Japan .....................................48-139845
Feb. 20, 1974 Japan .....................................49-20848

Related U.S. Application Data

[63] Continuation of Ser. No. 529,104, Dec. 3, 1974, abandoned.

[51] Int. Cl.$^2$ .............................................. B05D 3/02
[52] U.S. Cl. .................... 427/226; 65/60 D; 427/281; 427/375; 427/399; 428/432
[58] Field of Search ................... 427/399, 372 R, 226, 427/375; 428/432, 434; 65/60 C, 60 D

[56] References Cited

U.S. PATENT DOCUMENTS

| | | | |
|---|---|---|---|
| 2,662,035 | 12/1953 | Levi | 428/432 |
| 2,663,658 | 12/1953 | Schurecht | 428/434 |
| 3,252,831 | 5/1966 | Ragan | 428/434 |
| 3,293,075 | 12/1966 | Wildi | 428/432 |
| 3,429,742 | 2/1969 | Grego et al. | 428/434 |
| 3,468,745 | 9/1969 | Navez et al. | 428/434 |
| 3,511,681 | 5/1970 | Huey | 427/399 |
| 3,528,847 | 9/1970 | Grego et al. | 428/432 |
| 3,755,065 | 8/1973 | Chvatal | 428/432 |
| 3,775,154 | 11/1973 | Grego et al. | 428/432 |

Primary Examiner—Ronald H. Smith
Assistant Examiner—Sadie L. Childs
Attorney, Agent, or Firm—Wenderoth, Lind & Ponack

[57] ABSTRACT

A method for decorative coloring of glass, which comprises coating the surface of a glass article containing alkali metal oxides and sulfide sulfur with a composition comprising at least one of silver and copper compounds and a vanadium compound capable of forming vanadium pentoxide by subsequent heat-treatment, and then heat-treating the coated article at a temperature and for a period of time sufficient to obtain the desired degree of coloration.

7 Claims, No Drawings

METHOD FOR DECORATIVE COLORING OF GLASS

This is a continuation of application Ser. No. 529,104, filed Dec. 3, 1976, now abandoned, This invention relates to a method for decorative coloring of glass.

A method has previously been known for coloring glass or glass ceramics by coating a glass or glass ceramic article with a paste comprising a coloring ion such as silver or copper and if desired, a dispersing agent such as $Al_2O_3$, $TiO_2$ or clay, a plasticizer and a diluent, and then heating the coated article at a temperature below the softening point of the article for a time period sufficient to obtain the desired coloring. Colored article obtained by this method usually assume a uniform color, such as yellow, orange, red or amber, and where the glass or glass ceramic contains sulfide sulfur, they assume a brown to black color. In any case, the above method only affords a uniform coloration, and therefore, if it is desired to form some decorative design on the surface of the article, the above paste must be printed on the surface of the article by some printing means and then subjected to a suitable heating-treatment. This renders the overall process very complicated, and moreover, the decorative design obtained by this method is made up merely of a uniform color, and no shade of color nor multicolor effect can be obtained.

It is an object of this invention to provide a new method for decorative coloring of glass which eliminates the above-mentioned defects of the conventional glass coloring method, and which can form a granite-like decorative design (a mosaic decorative design having areas of irregular shapes and sizes) having a changing shade of color or a variety of colors on glass by a simple procedure.

According to this invention, there is provided a method for decorative coloring of glass which comprises coating the surface of a glass article containing alkali metals with a composition comprising at least one of silver and copper compounds and a vanadium compound capable of forming vanadium pentoxide by subsequent heat-treatment, and then heat-treating the coated article article at a temperature and for a period of time sufficient to obtain the desired degree of coloration.

This invention will be described below in greater detail.

The glass to which the method of this invention is applied includes ordinary non-crystalline transparent or translucent glass, glass ceramics rendered non-transparent by crystallization (to be referred to as crystallized glass ceramics), and crystalline transparent or translucent glass capable of being converted to glass ceramics by a crystallization heat-treatment (to be referred to as non-crystallized glass ceramics). The glass, and the glass ceramics either before or after crystallization are well known in the art. In the present specification and the appended claims, the glass and the glass ceramics are frequently termed simply "glass". It is essential that the glass used in this invention contains alkali metal oxides in its composition. Generally, the amount of the alkali metal oxide is 2 to 25%(on the basis of oxide). So long as this requirement is met, the method of this invention can be applied to any kinds of glass and glass ceramics.

According to the method of this invention, a composition comprising a silver compound and/or copper compound and a vanadium compound capable of forming vanadium pentoxide ($V_2O_5$) by subsequent heat-treatment is applied to the area to be decoratively colored of the surface of a glass article thereby to adhere the composition to the surface of the glass article so that the total amount of the silver compound and/or copper compound coated is about 0.2 to 2.0 mg/cm², preferably about 0.5 to 1.0 mg/cm², and the amount of the vanadium compound coated is about 0.4 to 2.5 mg/cm², preferably about 0.8 to 2.2 mg/cm². Preferably, the weight ratio of the total amount of the silver and/or copper compound to the amount of the vanadium compound is from 0.3 to 1.5. If desired, the coloring composition may contain a thickening agent such as methyl cellulose and a diluent such as water, which decompose during the subsequent heat-treatment. The composition is applied to the glass article in the form of a powder, paste, slurry or spray.

Examples of the silver compound that can be used in this invention are silver nitrate ($AgNO_3$), silver chloride (AgCl), silver sulfate ($Ag_2SO_4$), and silver chromate ($Ag_2CrO_4$).

Examples of the copper compound that can be used in this invention are cupric nitrate ($Cu(NO_3)_2.3H_2O$), cuprous chloride (CuCl), cupric chloride ($CuCl_2$), and cupric sulfate ($CuSO_4$).

Ammonium metavanadate ($NH_4VO_3$) is most preferred as the compound forming $V_2O_5$ by the subsequent heat-treatment, but vanadium pentoxide itself is also included within the compound.

The glass article coated with the coloring composition is then subjected to a heat-treatment which comprises heating it at a temperature and for a period of time sufficient to impart the desired coloration to the glass article. The heat-treatment temperature is usually higher than about 580° C., but below about 1000° C. Preferably, the heat-treatment is performed for at least 3 minutes. The upper limit of the heat-treating time is not critical, but can be selected as desired so that the desired coloration is obtained. Generally, the higher the heat-treatment temperature is, the shorter is the heat-treatment time.

When the glass to be decoratively colored by the method of this invention is a glass ceramic, it is usually preferred to apply the coloring composition to a non-crystallized glass ceramic article, and subjecting the coated glass article to the above heat-treatment thereby to perform the decoration and the crystallization of the glass article at the same time. In this case, the heat-treatment temperature should be one sufficient to crystallize the glass ceramic article and the heat-treatment time is also one sufficient to crystallize the glass ceramic article. Usually, the heat-treating temperature required for the crystallization is 700° to 1000° C., and the heat-treating time required for the crystallization is at least 2 minutes. Alternatively, an already crystallized glass ceramic article can be decoratively colored by applying the method of this invention.

A very beautiful colored decorative design is formed on the surface of the glass article by the method of this invention described above. The mechanism of this colortion has not yet been elucidated completely, but it is presumed that ion-exhange between at least one of silver and copper ions and the alkali ion in the glass has to do with this coloration. By this ion-exchange, Ag+ that has entered the glass or glass ceramics is reduced to Ag° to give color centers; when the glass contains sulfide sulfur ($S^{2-}$), the formation of silver sulfide is considered to be responsible for the color centers. Likewise, $Cu^+$ that has entered the glass or glass ceramics is reduced to $Cu°$ or oxidized to $Cu^{2+}$ to give color centers; when the glass contains sulfide sulfur, the formation of copper sulfide is considered to be responsible for the color centers.

The role that is played by the vanadium compound is considered as follows:

The vanadium compound present in the coloring composition is converted to vanadium pentoxide at the heat-treating temperatures, and this forms a melt together with the silver or copper compound on the surface to be coated. The melt permits poor wetting with glass, and this tendency becomes greater as the proportion of the vanadium compound in the composition increases. Consequently, even when the coloring composition is uniformly applied to the surface to be treated before the heat-treatment, the melt forms an assembly of droplets having irregular sizes. As a result, a nonuniform distribution of the concentration of silver or copper ion occurs on the surface of the article to be coated, and therefore, ion-exchange becomes nonuniform from place to place on the surface. In this manner, a mosaic decorative design is formed on the surface of the glass article.

What is more important, the vanadium pentoxide has the property of releasing oxygen at high temperatures. The release of oxygen further affects the coloration in a complicated way. For example, when a coloring composition comprising the copper compound and vanadium pentoxide is used, a nonuniform yellow or red mosaic design is formed at low heat treating temperatures and within relatively short periods of treating time. If the heat-treatment is carried out at a higher temperature for a longer period of time, $Cu^{2+}$ is formed by the oxidization action of the oxygen released from the vanadium pentoxide to form a blue to green mosaic design.

When the glass or glass ceramics contain sulfide sulfur, the coloration undergoes a more complicated change. The copper ion forms copper sulfide in the glass or glass ceramics as stated above. If vanadium pentoxide is copresent, the following reaction will take place by the effect of the oxygen released from vanadium pentoxide.

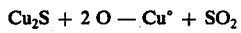

$$Cu_2S + 2O \rightarrow Cu° + SO_2$$

The resulting metallic copper forms colloidal particles, and exhibits the color of "copper red". Thus, the part where droplets of the above melt gather is colored red, but other parts where the amount of vanadium pentoxide is smaller is colored grey to black.

In this case, too, when the heat-treatment is carried out at higher temperatures for longer periods of time, the red portion undergoes an oxidative action of the oxygen released from vanadium pentoxide, and $Cu^{2+}$ is formed. Consequently, the coated surface is colored blue to green. In this manner, a mosaic decorative design in which several kinds of color are jointly present can be obtained.

When a composition consisting of the silver compound and vanadium pentoxide is applied to glass or glass ceramics containing sulfide sulfur, the part where droplets of the melt gather turns yellow as a result of formation of colloidal silver particles by the same mechanism as described above. But other parts assume brown presumably because of the formation of silver sulfide and a relatively small amount of colloidal silver particles.

When a composition consisting of the copper compound, the silver compound and the vanadium compound is applied to glass or glass ceramics containing sulfur sulfide, a decorative design consisting of many colors such as cream color, light yellow, green, grayish blue, and gray is formed.

As described above, the method of this invention gives a beautiful mosaic decorative design on the surface of glass or glass ceramics by a very simple procedure. The colored layer exists not only on the surface of the glass, but also goes to some depth inside the glass, thus affording a glass article having a colored layer of substantial thickness.

The depth to which the colored layer penetrates into the inside of the glass generally depends upon the composition of the glass and the heat-treating conditions. Whens the method of this invention is performed, baking residues sometimes remain on the surface of the resulting product. If desired, the product may be subjected to a grinding step in order to remove the baking residues. The decoratively colored glass article obtained in this invention may, if desired, be polished. In the method of this invention, the depth to which the colored layer penetrates into the inside of the glass article can be increased easily by properly choosing the treating conditions so that the coloration does not change even after these grinding and polishing steps.

Generally, the colored layer obtained by this invention is smooth, and the glass article exhibits the same durability and hardness as glass or glass ceramics not decoratively colored.

One preferred modification of the method of this invention is a method for decorative coloring of glass ceramics, which comprises coating the surface of a glass ceramic article, either crystallized or non-crystallized, containing alkali metals and sulfide with a paste consisting of at least one coloring agent selected from silver compounds and copper compounds, a vanadium compound capable of forming vanadium pentoxide by a subsequent heat-treatment, a dispersing agent and a diluent, heat-treating the coated glass ceramic article at a temperature and for a period of time sufficient to obtain the desired degree of coloration (when the glass ceramic article is non-crystallized, the heat-treatment is carried out at a temperature and for a period of time sufficient to crystallize the glass ceramics, thereby to form colored layers having different colors changing progressively from the surface to the inside of the article, and then selectively developing the colored layer by engraving, etching or polishing.

A method for decorative coloring of glass ceramics has previously been proposed which comprises abrading and polishing a glass ceramic article containing silicon oxide, aluminum oxide and ferric oxide and having a raised and depressed design having different colors between the surface and the inside, thereby to develop the color inside the article. However, this method has the disadvantage that the coloration obtained by this method is virtually limited to two colors selected from brown, green and black, etc.

On the other hand, there has been known a so-called "camero glass" technique whereby a glass article obtained by melt-adhering colored glass sheets of different colors is engraved to form a decorative design or image. It would be possible to convert this technique into a glass ceramic decorating method by rendering the above colored glass crystallizable. However, this technique is very complicated, and has the defect of being applicable only to products of small sizes.

In contrast, the above modification of this invention can be applied to glass ceramic articles having a uniform chemical composition and a uniform texture, and can form many kinds of colors such as yellow, red, orange, reddish-brown, creamy color, green, and brown in layers on the surface of the article. Thus, many kinds of colors not obtainable by the above-mentioned prior technique can be obtained.

The dispersing agent used in this method is, for example, talc, $TiO_2$, $ZrO_2$, $Fe_2O_3$, or clay. Water is most preferred as the diluent. The types and the amounts of the copper compound, silver compound and vanadium compound are the same as those describe hereinabove. Examples of the glass ceramic containing sulfide sulfur are those containing, as a nucleating agent, zinc sulfide (the color of glass ceramis is white), iron sulfide (the color of glass ceramis is black), antimony sulfide (the color of glass ceramics is brown), cadmium sulfide (the color of glass ceramis is yellow), and cadmium sulfide selenide. Examples of suitable glass ceramics to which the method of this invention is applied are those of the $SiO_2$—$Al_2O_3$—$MgO$—$CaO$—$Na_2O$ type which contain the above nucleating gents.

This modification is characterized in that a dispersing agent is used in the coloring composition. The use of dispersing agents makes it possible to inhibit the formation of a nonuniform distribution of the concentration of a silver or copper ion based on the above-mentioned formation of the melt, and a nearly uniform distribution of the concentration of the silver or copper ion results. In this modification, too, oxidation by the oxgen released from vanadium pentoxide and the conversion of metal sulfides to metallic colloidal particles by this oxygen take place in the same way as hereinabove described. The mechanism of coloration in this modified method is presumed to be as follows when the coloring agent is a copper compound.

A copper ion introduced into the glass ceramic article by ion-exchange as a result of heat-treatment is combined with sulfide sulfur contained in the glass ceramic article to form copper sulfide. In the part which is relatively near the surface of the glass ceramic article, the following reaction is considered to take place by the oxidative action of vanadium pentoxide contained in the coloring paste.

$$Cu_2S + 2 O \rightarrow 2Cu° + SO_2$$

The copper in the metallic state so formed constitutes colloidal particles, and assumes the color of "copper red". When this copper in the metallic state undergoes an oxidative action of oxygen released from vanadium pentoxide, a divalent copper ion ($Cu^{2+}$) is generated, and a blue to green color is formed. The oxidative action is considered to be dominated by the diffusion of an oxygen ion in the glass ceramic article, and the degree of the diffusion of oxygen ion is probably much smaller than the copper ion. Accordingly, the glass ceramic article subjected to heat-treatment contains copper of varying concentrations in varying states according to the depth from the surface, and therefore, assumes different colors according to the depth. In other words, coloration of a multilayered structure differing in color according to the depth is obtained in this case, and in each of the layers, the color is substantially uniform.

For example, when zinc sulfide is used as a nucleating agent, the surface of the glass article which undergoes the strongest oxidative action is colored green, and as the coloration goes deeper into the inside of the article, the color progressively becomes red, reddish-brown, dark brown, and pale brown, and in the inside of the article, the color is that of the glass ceramic article itself which is white in this case.

When the coloring agent is a silver compound, a similar phenomenon to the case of the copper compound occurs. In this case, the color is yellow on the surface of the glass ceramic article, and in the inside, it is gray to brown. Further inside the article, the color becomes that of the glass ceramic article itself.

The color of the above colored layer is determined mainly according to the composition of the coloring paste, the heat-treating conditions, and the composition of the glass ceramics.

By selectively removing the colored layers by such means as abrading and polishing, the desired decorative design of multi-colors can be obtained.

The products obtained by the method of this invention are useful as decorative article, receptacles, interior decorative materials and building materials.

The following Examples illustrate the present invention in greater detail.

EXAMPLE 1

This Example illustrates the preparation of glass having a colored mosaic design by applying the method of this invention to a flat plate of ordinary non-crystalline glass and crystalline glass ceramics.

Four kinds of glass (designated Nos. 1 to 4 in Table 1) having the compositions (% by weight) as shown in Table 1 were used.

Table 1

| Ingredients | Glass No. | 1 | 2 | 3 | 4 |
|---|---|---|---|---|---|
| $SiO_2$ | | 57.9 | 57.9 | 57.9 | 72.5 |
| $Al_2O_3$ | | 7.2 | 7.2 | 7.0 | 1.8 |
| MgO | | 1.6 | 1.6 | 1.5 | 4.1 |
| CaO | | 21.5 | 21.5 | 21.5 | 7.2 |
| $Li_2O$ | | 0.3 | 0.3 | 0.3 | 0 |
| $Na_2O$ | | 0.7 | 0.7 | 0.7 | 13.4 |
| $K_2O$ | | 6.6 | 6.6 | 6.6 | 0.8 |
| ZnO | | 0.5 | 0.5 | 0 | 0 |
| $B_2O_3$ | | 3.5 | 3.6 | 3.8 | 0 |
| $Fe_2O_3$ | | 0.06 | 0.06 | 0.3 | 0.1 |
| Sulfide sulfur | | 0.10 | | 0.3 | |
| Crystallizability | | Crystalline | Non-crystalline | Crystalline | Non-crystalline |

Table 2 below show the compositions (wt.%) of coloring compositions.

Table 2

| No | $Cu(NO_3)_2 3H_2O$ | CuCl | $Ag_2SO_4$ | $AgNO_3$ | $NH_4VO_3$ |
|---|---|---|---|---|---|
| A | 50 | — | — | — | 50 |
| B | — | 50 | — | — | 50 |
| C | 65 | — | — | — | 35 |
| D | — | — | 50 | — | 50 |
| E | — | — | 75 | — | 25 |
| F | — | — | — | 15 | 85 |
| G | 18 | — | 18 | — | 64 |
| H | 20 | — | 40 | — | 40 |
| I | 45 | — | 15 | — | 40 |

A suitable amount of water was added to each of the coloring compositions shown in Table 2. The resulting slurry was coated on a flat plate of glass under the conditions shown in Table 3, dried, and then heat-treated under the conditions shown in Table 3. The temperature was elevated in the heat-treatment according to the following program. That is to say, the coated glass was heated in an electric furnace from room temperature at a rate of 5° to 20° C. per minute, and maintained at each of the prescribed temperatures for the prescribed periods of time shown in Table 3, and then after cutting off the supply of electric power, allowed to cool in the furnace.

The treated flat glass plates were finished by grinding with a abading material of No. 600 (particle size of about 40 microns) or by polishing or by a float method shown in the parentheses in Table 3.

The float glass used was coated at the surface which had been in contact with the molten metal bath.

The baking residues adhering to the surface of the heat-treated glass plates were removed by a brush while being wetted with water. Of the samples in Runs Nos. 1 to 14 those which had been heat-treated at a temperature of above 800° C. were polished for 1 to 5 minutes by an ordinary polishing method using red iron oxide or cerium oxide. The other samples were washed after the removal of the baking residues.

The state of coloration of each of the samples obtained is shown in Table 3.

7.0% $Al_2O_3$, 3.7% $B_2O_3$, 2.0% MgO, 21.0% CaO, 0.3% $Li_2O$, 0.7% $Na_2O$, 6.6% $K_2O$, 0.6% ZnO and 0.1% sulfide sulfur was brush coated with a paste prepared by adding a suitable amount of water to a composition consisting of 1 part of copper nitrate ($Cu(NO_3)_2.3H_2O$), 1.5 parts of ammonium metavanadate ($NH_4VO_3$) and 2 parts of talc. The coated glass ceramic disc heated in an electric furnace from room temperature at a rate of 5° to 20° C. per minute, maintained at 950° C. for 10 minutes, and allowed to cool by cutting off the electric supply. There was obtained a glass ceramic plate having a pale brown layer about 60 microns thick, a dark brown layer about 70 microns thick, a reddish-brown layer about 100 microns thick, a red layer about 50 microns thick, and a bright greenish brown layer about 50 microns thick in the upwardly progressing order on the white glass ceramic disc.

The convex portion on the surface of the glass ceramic disc was removed by abrasion to make it flat. The maximum thickness of the convex portion which was removed at this time was about 0.4 mm. As a result, the pale brown layer, dark brown layer, reddish brown layer, red layer and bright greenish-brown layer appeared successively and concentrically around the central circular white layer.

Table 3

| Run No. | Class No. | Coating composition | Amount of coating (mg/cm²) | Heat-treating conditions (° C. - minutes) | Color Mosaic portion | Color Ground portion |
|---|---|---|---|---|---|---|
| 1 | 1 (# 600) | A | 5 | 900 – 10 | Red, orange | Grey |
| 2 | 1 (# 600) | A | 10 | 900 – 10 | Bright red | Grayish red |
| 3 | 1 (polish) | A | 10 | 900 – 100 | Red | Black |
| 4 | 2 (# 600) | A | 10 | 800 – 30 | Orange brown, blue | Pale brown |
| 5 | 3 (# 600) | A | 10 | 900 – 10 | Pink | Black |
| 6 | 4 (float) | B | 10 | 630 – 5 | Red | Pale red |
| 7 | 1 (# 600) | C | 5 | 900 – 10 | Grayish red | Black |
| 8 | 2 (polish) | D | 10 | 750 – 10 | Yellow | White (semi-transparent) |
| 9 | 1 (# 600) | E | 5 | 900 – 10 | Pale yellow | Brown |
| 10 | 4 (float) | F | 3 | 630 – 5 | Amber | Pale yellow |
| 11 | 1 (polish) | G | 10 | 900 – 10 | Creamy color | Pale grayish blue |
| 12 | 1 (# 600) | H | 8 | 900 – 10 | Yellow, creamy | Pale gray |
| 13 | 1 (polish) | H | 8 | 900 – 10 | Yellow, orange brown | Pale gray |
| 14 | 1 (# 600) | I | 10 | 900 – 10 | Green | Cream |

Run No. 2 and Run No. 3 are the same in the glass composition, the coating composition and the heat-treating conditions, but differ from each other in the finish of the surface to be decorated; so are and do Runs No. 12 and 13. Since the difference in the coarseness of the surface results in the difference in the state of gathering the melt, the resulting decorative design becomes different as shown in Table 3.

The baking residues could be re-used by adjusting their composition. Furthermore, in the case of glass ceramics, decoration and crystallization can be performed at the same time by a single heat-treatment step. Accordingly, the method of this invention can give decoratively colored glass or glass ceramic articles suitable for tableware, decorative articles and interior and exterior decorative building materials, with economic advantage.

EXAMPLE 2

This Example illustrate the decorative coloring method of this invention using a coloring composition containing talc as a dispersing agent.

The surface of a glass ceramic disc not yet crystallized and having a shallow convex curved surface which had the composition by weight of 58.0% $SiO_2$,

EXAMPLE 3

The surface of a glass ceramic flat plate not yet crystallized and having the same composition as in Example 2 was coated with a paste prepared by adding a suitable amount of water to 1 part of copper nitrate, 0.1 part of silver nitrate, 1.5 parts of ammonium metavanadate and 2 parts of talc. The coated glass was heat-treated under the same conditions as in Example 2. As a result, a black brown layer about 70 microns thick, a red brown layer about 120 microns thick, an orange layer about 50 microns thick and a green layer about 10 microns thick were formed in the upwardly progressing order on the white glass ceramics.

The surface of the resulting colored glass ceramic flat plate was divided into 5 areas. A first area was not polished, but second to fifth areas were removed by polishing to a depth 30, 80, 200 and 300 microns respectively. As a result, there was obtained a decoratively colored glass ceramic plate in which the first area was green, the second area was orange, the third area was reddish brown, the fourth area was black brown, and the fifth area was white.

What we claim is:

1. A method for decorative coloring of glass having a granite-like decorative design, which comprises coating the surface of a glass article containing alkali metal oxides and sulfide sulfur with a composition comprising a copper compound and a vanadium compound capable of forming vanadium pentoxide by subsequent heat-treatment, the amount of said vanadium compound being such that vanadium pentoxide resulting from the heat-treatment of the vanadium compound forms a melt together with the copper compound on the surface of the glass article and the melt forms an assembly of droplets having irregular sizes, the weight ratio of the copper compound coated to vanadium compound coated being 0.3 to 1.5, and then heat-treating the coated article at a temperature of from about 580° C to about 1000° C and for a period of time sufficient to obtain the desired degree of coloration.

2. The method of claim 1 wherein the heat-treating time is at least 3 minutes.

3. The method of claim 1 wherein the total amount of the copper compound to be coated is about 0.2 to 2.0 mg/cm$^2$.

4. The method of claim 1 wherein the amount of the vanadium compound is 0.4 to 2.5 mg/cm$^2$.

5. The method of claim 1 wherein said glass is a non-crystalline glass.

6. The method of claim 1 wherein said glass is a crystalline glass ceramic.

7. The method of claim 1 wherein said glass is a glass ceramic before crystallization, and said heat-treating temperature and time are at least sufficient to crystallize said glass ceramic.

* * * * *